United States Patent [19]

Nishiyama et al.

[11] Patent Number: 4,507,980
[45] Date of Patent: Apr. 2, 1985

[54] LOW VIBRATION-LEVEL REMOTE CONTROL GEARSHIFT LINKAGE FOR MANUAL TRANSMISSION

[75] Inventors: Taichiro Nishiyama, Musashimurayama; Shinsaku Tsuji, Atsugi, both of Japan

[73] Assignee: Nissan Motor Company, Limited, Yokohama, Japan

[21] Appl. No.: 454,614

[22] Filed: Dec. 30, 1982

[30] Foreign Application Priority Data

Mar. 1, 1982 [JP] Japan .................. 57-30499

[51] Int. Cl.³ .................. G05G 9/16; F16M 13/00
[52] U.S. Cl. .................. 74/473 R; 74/491; 188/378; 248/559
[58] Field of Search ............ 188/378; 74/573 R, 574, 74/590, 603, 604, 473, 473 R, 491; 248/559

[56] References Cited

U.S. PATENT DOCUMENTS

| | | | |
|---|---|---|---|
| 1,497,735 | 6/1924 | Richardson | 74/573 |
| 2,001,165 | 5/1935 | Swennes | 74/604 |
| 2,652,700 | 9/1953 | Seibel | 74/574 |
| 4,086,822 | 5/1978 | Kuroda | 74/473 R |
| 4,454,820 | 6/1984 | Raschbichler | 248/559 X |

FOREIGN PATENT DOCUMENTS

| | | |
|---|---|---|
| 2215044 | 8/1974 | France . |
| 52-94626 | 7/1977 | Japan . |
| 1390886 | 4/1975 | United Kingdom . |
| 1554654 | 10/1979 | United Kingdom . |

*Primary Examiner*—Allan D. Herrmann
*Assistant Examiner*—Shirish Desai
*Attorney, Agent, or Firm*—Schwartz, Jeffery, Schwaab, Mack, Blumenthal & Koch

[57] ABSTRACT

A remote control gear shift linkage system for a manual transmission comprises a manually operable control lever, a control rod connected between the control lever and the transmission for transmitting a movement of the control lever to the transmission to effect a gear shift, and a support rod supported on a vehicle body for supporting the control lever. In order to avoid unwanted influences of a resonance of the remote control linkage, a concentrated mass member is fastened to a portion of the support rod. The concentrated mass member may take the form of a sleeve fitted over the support rod or a solid bar fitted into the bore of the hollow support rod.

4 Claims, 8 Drawing Figures

(A)

(B)

(A)

(B)

LOW VIBRATION-LEVEL REMOTE CONTROL GEARSHIFT LINKAGE FOR MANUAL TRANSMISSION

BACKGROUND OF THE INVENTION

The present invention relates to a remote control gear shift linkage for a manual type transmission, and more specifically to such a remote control linkage suitable for a vehicle having an engine mounted transversely of the vehicle, especially a front engine front wheel drive vehicle.

A remote control gear shift linkage transmits a driver's manual input movement applied on a control lever (gear shift lever) to a transmission for performing a desired gear shift. However, the remote control linkage also serves to transmit vibrational movements caused by the engine from the transmission to the control lever. Especially, if resonance occurs in the remote control linkage, vibration of the engine is amplified, and the control lever is vibrated severely and noisely.

SUMMARY OF THE INVENTION

It is an object of the present invention to provide a remote control gear shift linkage for a manual transmission which is arranged to prevent a violent vibration of a control lever.

According to the present invention, the remote control gear shift linkage system for a manual transmission comprises a manually operable control lever, a control rod connected between the control lever and the transmission, and a support rod means for supporting the control lever. The control rod serves to transmit a movement of the control lever to the transmission for effecting a desired gear shift of the transmission. The support rod means is supported on a vehicle body. The support rod means comprises a support rod which has mass means which is fastened to a portion of the support rod so that the mass of that portion of the support rod is increased. In disclosed embodiments, the mass means is placed at the middle point of the length of the support rod. The mass means may take the form of a sleeve fitted over the support rod or the form of a solid bar fixedly inserted in the bore of the hollow support rod.

With this arrangement, the fundamental resonance frequency of a bending vibration of the remote control linkage can be so changed that a resonance occurs outside the ordinary working engine rotational speed range, or a resonance occurs at an engine speed where the vibration level of the engine is very low.

DETAILED DESCRIPTION OF THE INVENTION

Figure 1:
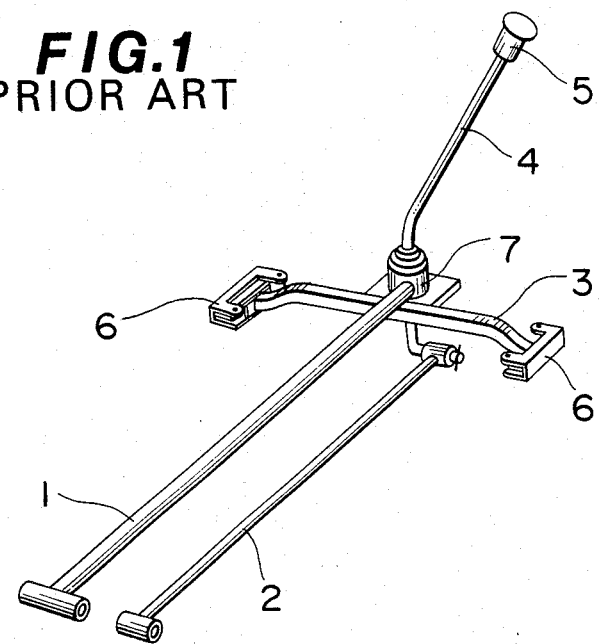
FIG. 1 is a perspective view showing a remote control gear shift linkage system for a manual transmission to which the present invention is not applied yet.

In a conventional type remote control mechanism shown in FIG. 1, there are provided a support rod 1 and a control rod 2. A front end of the support rod 1 is connected to a housing of a transmission (not shown). The support rod 1 extends toward the rear of the vehicle, and its rear end is fixed to a support cross member 3. A front end of the control rod 2 is connected with a gear shift mechanism of the transmission. The control rod 2 extends toward the rear of the vehicle, and its rear end is connected with a lower end of a control lever 4. The control lever 4 has a control knob 5 on the top. Both ends of the support cross member 3 are attached to a vehicle body through rubber holder members 6. The support cross member 3 swingably supports the control lever 4 through a ball socket 7 which receives a ball portion of the control lever 4. Thus, the support cross member 3 supports the remote control linkage on the vehicle body.

In this system, vibration of the engine (a second mode vibration component of the engine revolutions) is transmitted through the support rod 1 and the control rod 2 to the control lever 4. When the frequency of the engine vibration coincides with the natural frequency of bending vibration of the support rod 1 and the control rod 2, the control lever 4 and the control knob 5 begin to vibrate violently. Usually, such violent vibrations take place within an ordinary working engine speed range, so that the mechanical vibrations themselves and the noise caused by the vibrations are very uncomfortable to the driver and passengers.

In a four cylinder engine, for example, exciting forces are produced two times in one revolution of the engine. An upper limit of the ordinary working engine speed range can be assumed to be 6000 rpm. Therefore, the violent vibration of the control lever 4 can be prevented by making the natural frequency of the remote control linkage higher than 200 Hz so that a resonance occurs outside the ordinary working speed range. The violent vibration can be also prevented by making the natural frequency of the remote control linkage so low that a resonance occurs at an engine speed where the vibration level is sufficiently low.

The natural frequencies of the support rod 1 and the control rod 2 can be changed by changing the lengths and diameters of these rods. However, the lengths of the rods are determined by the vehicle size, and accordingly, they can not be changed freely. The outer diameters of the rods are also restricted by the required rigidity or durability of these rods. As a result, the fundamental natural frequency of a bending vibration of the remote control linkage can be changed only within the very narrow range of 120–160 Hz, so that a satisfactory effect can not be obtained.

The fundamental natural frequency of the remote control linkage can be also changed by increasing the thickness of the cylindrical wall of the support rod 1 and the control rod 2 which are in a hollow cylinder shape. However, this results in an undesired increase of weight. Besides, the inertia of the remote control linkage tends to help a self disengagement of a gear in the transmission due to shocks received during a rough road travel of the vehicle. Accordingly, the natural frequency of the control linkage can not be changed sufficiently in this case, either.

An arrangement in which a concentrated mass is attached to the control rod 2 has been proposed by Japanese Utility Model provisional publication No. 94626/1977. In this arrangement, however, the inertia mass of the control rod is increased by the concentrated mass, so that the required manual gear shift operating effort is increased, a feeling of the gear shift operation is impaired, and the tendency to a gear self disengagement of the transmission is promoted.

Figure 2:
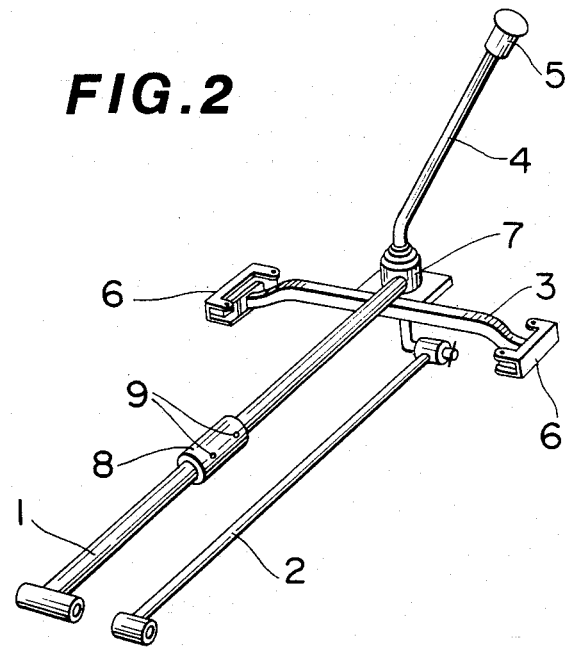
FIG. 2 is a perspective view showing a remote control gear shift linkage system according to the present invention.
Figure 3:
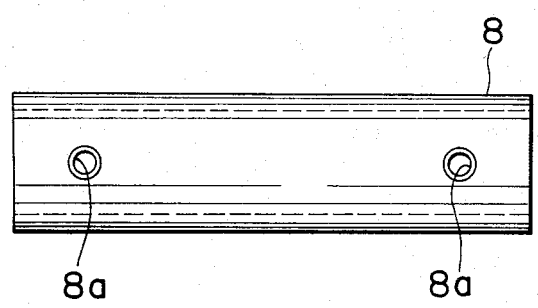
FIG. 3A is a side view of a concentrated mass member used in the linkage system of the present invention.
FIG. 3B is an end view, partly broken, of the concentrated mass member of FIG. 3A.
Figure 3:
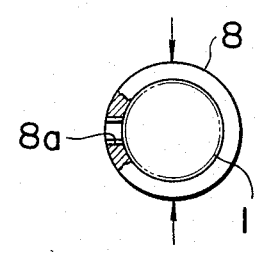

One embodiment of the remote control system according to the present invention is shown in FIG. 2, in which the same reference numerals as in FIG. 1 are used to denote like parts. In this system, a concentrated mass member 8 is attached to a middle portion of the support rod which becomes an atinode of the fundamental bending vibration of the support rod. In this embodiment, the concentrated mass member 8 is in the form of a sleeve having an inner diameter slightly greater than the outer diameter of the support rod 1, as shown in FIG. 3. The sleeve of the mass member 8 has a plurality of threaded holes 8a arranged axially. There are two of the threaded holes 8a in the example of FIG. 3. The mass member 8 is fitted over the support rod 1 and is slightly crushed by compressing it along the radial direction as shown by arrows in FIG. 3B so that the mass member is held at a predetermined position (the middle point of the length of the support rod, for example). Then, screw fasteners 9 are screwed into the threaded holes 8a so as to fasten the mass member 8 to the support rod 1.

Figure 4:
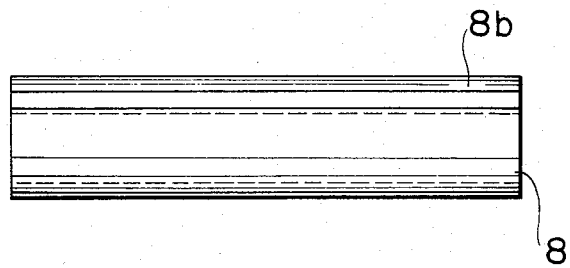
FIGS. 4A and 4B are a side view and an end view, respectively, showing another example of the concentrated mass member.
Figure 4:
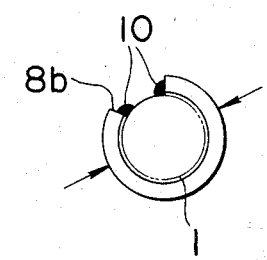

FIG. 4 shows another design for the sleeve of the mass member 8. Like the preceding example, the sleeve of FIG. 4 has an inner diameter slightly greater than the outer diameter of the support rod 1. But, this sleeve is further formed with a slit 8b which extends axially over the full length of the sleeve. This sleeve 8 is fitted over the support rod 1 and crushed slightly by compression forces shown by arrows in FIG. 4B so as to locate the sleeve at a predetermined longitudinal position of the support rod 1. Then, the sleeve 8 is fastened to the support rod 1 by paddings 10 welded at corners formed between the outer cylindrical surface of the support rod 1 and the cut ends of the slit 8b.

Figure 6:
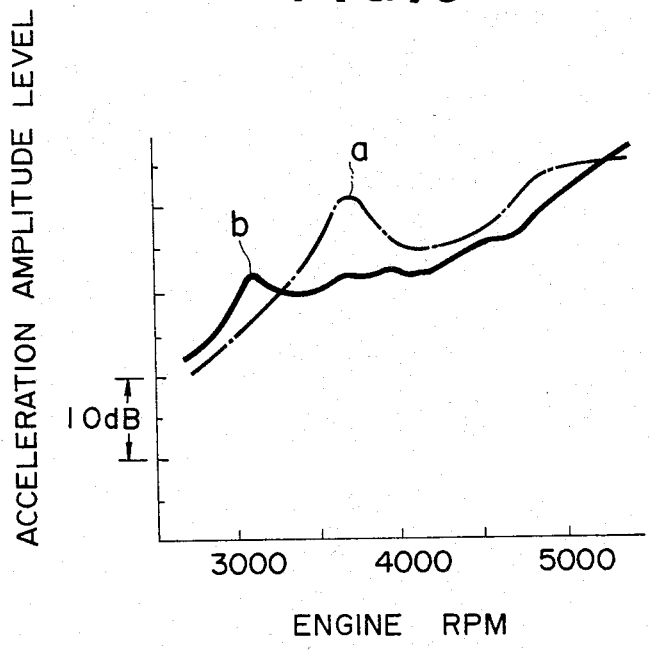
FIG. 6 is a graphical representation for comparing the acceleration amplitude level of a control lever vibration in the cases of the present invention and the conventional type construction.

The thus constructed remote control linkage of the present invention has a desirable effect on reduction of vibrations of the control lever as shown in FIG. 6. The data shown in FIG. 6 are obtained by measuring the acceleration amplitude level of a control lever vibration caused by a second mode vibration of a four cylinder engine during deceleration of a vehicle at a third speed gear ratio. The size of the support rod used in this measurement is as follows: Its outer diameter is 21.7 mm, its wall thickness 1.4 mm and its length 700 mm. The acceleration amplitude is measured at the top end of the control lever. A one-dot chain line in FIG. 6 shows the acceleration amplitude level when the conventional type remote control linkage shown in FIG. 1 is employed. Since this linkage has a high fundamental resonance frequency of 120 Hz, it falls into a state of resonance of a bending vibration at engine rotational speeds near 3700 rpm, so that a peak of the acceleration amplitude level is formed. This peak level is very high because of the high engine rpm, and accordingly, the control lever is violently vibrated back and forth.

A solid line in FIG. 6 shows the vibrational acceleration amplitude level of the control lever when the remote control linkage of the present invention is employed. In this remote control linkage, the mass member 8 of 100 gram is attached to the middle portion of the support rod 1. The natural fundamental frequency of a bending vibration of this linkage is reduced to 105 Hz, so that a bending vibration resonance occurs near an engine speed of 3100 rpm, as shown by a peak b of the solid line of FIG. 6. Because this engine speed is low, this peak level is lower than the peak level of the one dot chain line by about 10 dB, so that a violent vibration of the control lever is prevented. As evident from the comparison between the solid line and the one-dot chain line in FIG. 6, the acceleration amplitude level of the solid line according to the present invention is lowered over a wide engine speed range from about 3300 rpm to the upper limit of the ordinary working engine speed range.

In general, when rod is vibrating transversely, its fundamental resonance frequency $\omega_n$ is given by $$\omega_n = \frac{\lambda_n^2}{l^2} \sqrt{\frac{EIg}{\gamma A}},$$

where $\lambda_n$ is a constant which is determined by conditions of restraints existing at the two ends of the rod, l the length of the rod, E its Yong's modulus, A its cross sectional area, I its second moment of inertia, g acceleration of gravity, and $\gamma$ its specific weight. When the rod is rigidly supported at both ends as in the case of the support rod 1, $\lambda_n^2$ is equal to $\pi^2$. The following size is a typical example of support rod sizes actually employed in many automobiles: The outer diameter of the support rod of a hollow cylinder is 21.7 mm, its wall thickness 1.4, and its length 700 mm. If these values of the rod size are applied to the above mentioned equation, the value of the frequency becomes approximately 120 hz, as mentioned before. The value of the frequency can be lowered by increasing the wall thickness of the hollow cylindrical support rod. However, in order to obtain the frequency of about 105 hz, it is necessary to have the thickness of 10 mm, which means the support rod is nearly a solid rod. Accordingly, the weight of the support rod 1 is increased considerably, and there arises a need for increasing the strength of support portions of the support rod. These facts cause a considerable increases of a automobile weight. According to the present invention, a sufficiently low frequency is obtained by attaching the concentrated mass member of only about 100 gram to the support rod. The weight increase caused by this is almost negligible.

Figure 5:
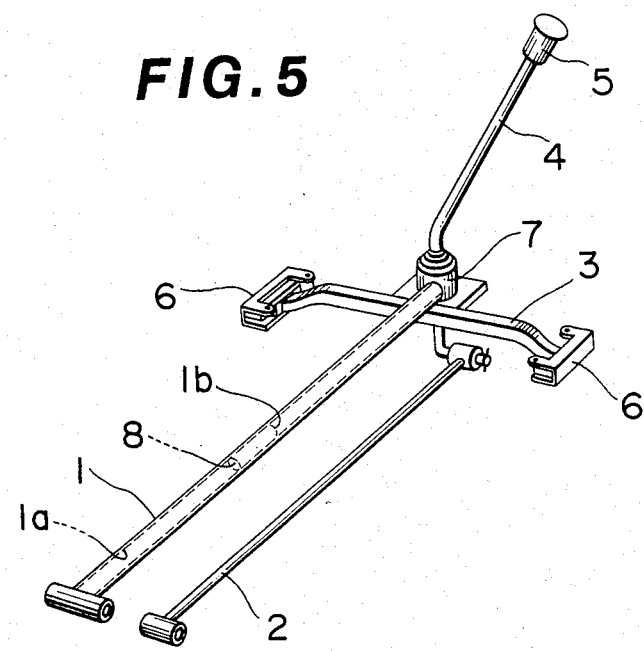
FIG. 5 is a perspective view of another embodiment of the remote control linkage system according to the present invention.

FIG. 5 shows still another design of the support rod according to the present invention. In this design, the concentrated mass member 8 consists of a short solid round bar. This solid bar is tightly fitted in a bore 1a of the support rod 1. In this case, it is possible to employ a method in which the support rod is cut into two halves at a portion 1b where the concentrated mass member is attached, the concentrated mass member is tightly inserted, and then the two halves of the support rod are joined together by butt welding.

Thus, according to the present invention, the concentrated mass member 8 is fixed to the support rod 1 which does not move in accordance with a manual input movement of the control lever, unlike the control rod. By so doing, the fundamental resonance frequency of a bending vibration of the remote control linkage is changed to a value which lies outside the ordinary working engine speed range or to a value corresponding to a low engine speed where the vibration level of the engine is low enough. With this arrangement, a violent vibration of the control lever caused by a resonance is prevented without making the gear shift operation heavy and without increasing the tendency of a self gear disengagement of the transmission. The desired frequency of the linkage can be obtained by adding only about 100 gram of the concentrated mass member to the weight of the support rod, so that the weight increase resulting from the application of the present invention does not exert a bad influence on the vehicle total weight. There is no need to change the dimensions of the linkage, so that the present invention is applicable to all types of automobiles without placing restrictions on the automobile layout.

What is claimed is:

1. A remote control gear shift linkage system for a manual type vehicular transmission, comprising:
   a manually operable control lever having upper and lower ends,
   a support member for supporting said control lever at an intermediate portion thereof between said upper and lower ends so that said control lever is swingable at said intermediate portion,
   means for resiliently mounting said support member to a vehicle body,
   a control rod connected between said lower end of said control lever and the transmission, for transmitting movement of said control lever to the transmission to effect a gear change of the transmission, a support rod
   connected between said support member and a case of the transmission, and
   mass means fastened to a portion of said support rod for altering the resonant frequency of said support rod.

2. A remote control linkage system according to claim 1, wherein said mass means is fastened to said support rod at a middle portion of the length of said support rod.

3. A remote control linkage system according to claim 2, wherein said mass means is a sleeve fitted over said support rod.

4. A remote control linkage system according to claim 2, wherein said support rod is a hollow cylinder and said mass means is a solid bar fitted in the bore of said support rod.

* * * * *